3,298,980
ALKYLENE OXIDE POLYMER COMPOSITIONS FLEXIBILIZED WITH SALTS OF CARBOXYLIC ACIDS
Robert D. Lundberg and Robert W. Callard, St. Albans, W. Va., assignors to Union Carbide Corporation, a corporation of New York
No Drawing. Filed Aug. 1, 1963, Ser. No. 299,194
7 Claims. (Cl. 260—18)

The present invention is concerned with novel improved alkylene oxide polymer compositions, and in particular, with high molecular weight alkylene oxide polymer compositions containing certain ammonium or alkali metal salts in an amount sufficient to improve the flexibility and preferably the clarity of the alkylene oxide polymer. The invention is also concerned with films or sheets of the aforementioned alkylene oxide polymer compositions, the terms film and sheets being employed herein interchangeably insofar as product form is concerned. In addition, the invention is concerned with novel film-forming solutions of the aforementioned alkylene oxide polymer compositions.

High molecular weight, water-soluble alkylene oxide polymers are well known in the art and useful in diverse applications. For instance, such polymers have been employed as thickeners and binders, typically in food and pharmaceutical applications, as plasticizers, adhesives, warp sizes, etc. The present invention now provides homogeneous, high molecular weight, water-soluble alkylene oxide polymer compositions which, in film form, are flexible and usually substantially transparent, and consequently, eminently suited for use as packaging material, and the like. Such physical properties distinguish the alkylene oxide polymer compositions of this invention from conventional alkylene oxide polymers which, in similar form, are ordinarily stiff and relatively opaque. In addition, the alkylene oxide polymer compositions of this invention, unlike conventional alkylene oxide polymers, evidence a high degree of adhesion to various solid substrates such as glass and metal, and are therefore also well suited for use as coatings, and the like. The improved alkylene oxide polymer compositions of this invention can, of course, also be employed in uses such as those described above in connection with conventional alkylene oxide polymers.

The alkylene oxide polymers contemplated by the invention are the normally solid, high molecular weight polymers produced by the conventional polymerization of a lower alkylene oxide, viz. ethylene oxide, propylene oxide, butylene oxide, or mixtures thereof, particularly mixtures in which ethylene oxide is the major component. Thus, the alkylene oxide polymers contemplated include both homopolymers and copolymers of lower alkylene oxides, of which those containing a vicinal epoxide group are typical. For convenience, such polymers are also hereinafter referred to interchangeably as poly(lower alkylene oxides). In addition, the alkylene oxide polymers contemplated by this invention include copolymers of one or more of the lower alkylene oxides with a minor amount, e.g. up to about 25 percent by weight of a different polymerized monomer, such as vinylidene chloride, vinyl acetate, methyl methacrylate, styrene, acrylonitrile, butadiene, etc.

The high molecular weight of the alkylene oxide polymers can be defined by reference to the viscosity of the polymers, which, as is known in the art, is a direct measure of molecular weight. More particularly, the alkylene oxide polymers contemplated by this invention are characterized by having a reduced viscosity of from about 0.5 to about 100, or higher. The reduced viscosity of a polymer, it is to be noted, is the value obtained by dividing the specific viscosity of a polymer solution by the concentration of polymer in the solution, the concentration being measured in grams of polymer per 100 milliliters of solvent at a given temperature. The specific viscosity of the polymer solution is obtained by dividing the difference between the viscosity of the polymer solution and the viscosity of the solvent by the viscosity of the solvent. The reduced viscosities herein described are, in all instances, values measured or determinable at a concentration of 0.2 gram of polymer in 100 milliliters of acetonitrile and at a temperature of 30° C.

The alkylene oxide polymers contemplated by this invention are also characterized by having an aqueous bulk viscosity of from about 10 up to about 1,000,000. The term "aqueous bulk viscosity," as employed herein, refers to the value obtained by measuring the viscosity of the stated concentration of polymer in water on a model RVF Brookfield viscometer at two revolutions per minute and at ambient room temperature, i.e. from about 24° C. to about 27° C., using the largest spindle consistent with an on-scale reading. Unless specifically stated otherwise, the aqueous bulk viscosities referred to herein are measured using a 5 percent by weight solution of the polymer in water.

It has also been found advantageous throughout this disclosure to refer interchangeably to reduced viscosities and aqueous bulk viscosities. The relationship between these values, insofar as they apply to a poly(ethylene oxide), can be seen from Table I below.

TABLE I

| Reduced Viscosity | Aqueous Bulk Viscosity | |
|---|---|---|
| | At 1%[1] | At 5%[1] |
| 1.3 | ---------- | 100 |
| 2.7 | ---------- | 1,000 |
| 4 | ---------- | 10,000 |
| 11 | 150 | 50,000 |
| 22.5 | 800 | 180,000 |
| 31 | 3,000 | ---------- |
| 39 | 6,500 | ---------- |

[1] Based upon the weight of solution.

The alkylene oxide polymers contemplated by this invention can be produced by various conventional polymerization techniques. The production of such polymers is, for instance, the subject matter of the application entitled "Polymerization of Epoxides," by F. N. Hill and F. E. Bailey, Jr., Serial No. 587,933, filed May 29, 1956, now abandoned, and assigned to the same assignee as the present application. The prior application teaches the production of poly(alkylene oxides) by solution polymerization in which an alkylene oxide is contacted with a divalent metal carbonate catalyst, particularly a carbonate of a divalent metal having an atomic number greater than 11 and less than 57, such as, for example, the carbonates, of magnesium, calcium, barium, zinc, strontium, cadmium, iron, cobalt, nickel, manganese, etc. These metal carbonate catalysts are advantageously employed in concentrations in the range of from about 0.3 to about 3 percent by weight based upon the weight of the alkylene oxide. The polymerization reaction is conducted in the liquid phase at a temperature of from about 70° C. to about 150° C. For further information in this regard, reference is made to the disclosure of application Serial No. 587,933.

The production of a granular poly(alkylene oxide) is the subject matter of the application entitled, "Polymerization of Epoxides and New Products Obtained Thereby," by F. N. Hill, J. T. Fitzpatrick, and F. E. Bailey, Jr., Serial No. 587,955, filed May 29, 1956, now abandoned, and assigned to the same assignee as the present application. This prior application teaches the production of a granular poly(alkylene oxide) comprising particles less than 5 mesh in size (U.S. Standard size sieve) by suspension polymerization in which an alkylene oxide is contacted with a catalyst such as an amide of a metal of Group II of the Periodic Table having an atomic number greater than 19 and less than 57, an alkaline earth metal hexammoniate, or the decomposition product of an alkaline earth metal hexammoniate containing only the alkaline earth metal nitrogen, and hydrogen, particularly in which the alkaline earth metal is calcium, barium, or strontinum. These catalysts are advantageously empolyed in concentrations of from about 0.2 to about 10 percent based upon the weight of the alkylene oxide. The polymerization reaction is carried out in a liquid organic medium which is a solvent for the monomer and in which the polymer is insoluble, at a temperature of from about 0° C. to about 70° C. Agitation of the reaction mixture during polymerization generally results in the production of a higher molecular weight polymer having a reduced viscosity above about 30. For further information in this regard, reference is made to the disclosure of application Serial No. 587,955.

Other conventional polymerization techniques, such as that described in U.S. Patent 2,971,988, can also be employed to produce the alkylene oxide polymers without deterring from the scope of this invention.

In producing the improved alkylene oxide polymer compositions of this invention, the alkylene oxide polymer hereinabove described is intimately admixed or blended with a normally solid salt selected from the group consisting of the ammonium and alkali metal halides, the ammonium and alkali metal thiocyanates, and the ammonium and alkali metal salts of aliphatic and aromatic carboxylic acids preferably containing from about 4 to about 22 or more carbon atoms and including both unsubstituted hydrocarbon carboxylic acids and carboxylic acids containing insert substituents such as hydroxyl groups, and the like. As typical of such salts, there can be mentioned ammonium bromide, ammonium iodide, ammonium chloride, sodium iodide, potassium iodide, ammonium thiocyanate, sodium thiocyanate, potassium thiocyanate, the alkyl carboxylates such as ammonium butyrate, potassium 2-ethylhexoate, sodium laurate, potassium myrisate, sodium octanoate, etc., the alkenyl carboxylates such as ammonium hydrosorbate, sodium oleate, sodium ricinoleate, potassium brassidate, etc., the diolefinic carboxylates, such as sodium sorbate, potassium linoleate, etc., the aryl carboxylates such as ammonium benzoate, sodium salicylate, potassium naphthoate, etc., and the like. The corresponding dicarboxylates can also be employed.

The amount of salt incorporated should be sufficient to enhance the physical properties of the alkylene oxide polymer materially, particularly the flexibility, and desirably the clarity and adhesiveness of the polymer. To this end, the selected salt is ordinarily employed in a concentration of at least about 10 to about 50 percent by weight of the alkylene oxide polymer, optimum results being realized at concentrations of from about 20 to about 40 percent based in like manner. As the salt concentration is increased within the aforementioned range, a concomitant increase in the flexibility and clarity of the resulting polymer composition can generally be observed. However, when the salt concentration exceeds 40 to 50 percent by weight, the clarity of the polymer composition ordinarily decreases, and further addition of salt does not further enhance flexibility. Without wishing to be bound by theory, it is believed that these changes in physical properties are attributable at least in part to a decrease in crystallinity engendered by the incorporation of the salt which may complex with the alkylene oxide polymer, the changes noted as the salt concentration exceeds 40 to 50 percent by weight being due to the presence of excess salt. In some instances, it may be desirable to use a mixture of two or more of the aforementioned salts in order to obtain optimum advantage. Particularly good results, evidenced in terms of prolonged flexibility and clarity have been obtained, for example, using a mixture of sodium iodide and potassium iodide in a proportion of from about 20 to about 80 percent by weight of either component.

Any suitable method for admixing or blending the alkylene oxide polymer with the salt can be employed. By way of illustration, one convenient technique involves milling the components on a roller mill, or the like, in conventional manner. In this operation, a temporary solvent can also be incorporated in the composition being milled, if desired, preferably in a proportion of from about 5 to about 30 percent by total weight. The solvent is then generally evolved from the resulting milled sheet during the milling operation or upon subsequent drying. Films of the improved alkylene oxide polymer compositions can also be cast from solutions of the polymer onto a substrate such as glass, metal, or the like, in conventional manner.

In this connection, it has been found that lower alkanols containing from 1 to about 4 carbon atoms, such as methanol, ethanol, butanol, etc., although not solvents for the alkylene oxide polymer per se, are excellent solvents for the improved alkylene oxide polymer compositions of this invention, and particularly well suited for use as film casting solvents. Such solutions are obtained conveniently by admixing the alkylene oxide polymer composition with a solvating amount of lower alkanol, preferably in a proportion of from 50 to about 95 percent alkanol by total weight, and allowing the mixture to stand at room temperature or at an elevated temperature up to about 60° C. until solution of the alkylene oxide polymer occurs. Occasional mild agitation will facilitate solution, as will mild heating. However, extensive agitation or heating is to be avoided since such physical or thermal abuse may well engender an excessive, unwanted degradation of the alkylene oxide polymer. The salt employed as a component of the alkylene oxide polymer composition can, alternatively, be initially dissolved in the solvent and the alkylene oxide polymer subsequently admixed therewith in solution. Films of the alkylene oxide polymer composition are then obtained upon drying the solution, preferably at a temperature of from about 25° C. to about 75° C.

The invention, and the advantages accruable in accordance therewith, can be illustrated further by the following specific examples of its practice, although in no way limited thereto. In connection with the examples, the stiffness modulus, which is a direct measure of the relative flexibility and crystallinity of the products, with decreasing stiffness modulus values indicating increasing flexibility and decreasing crystallinity, was determined by an Instron tensile-testing apparatus measuring the secant stiffness at 1 percent extension over a range of temperature in accordance with ASTM method D–638, p. 387, ASTM Standards on Plastics (March 1961).

*Example 1*

In a glass vessel equipped with a stopper, 5 g. of potassium iodide were dissolved in sufficient anhydrous methanol to make up 100 ml. of solution. To this solution there were added 10 grams of a poly(ethylene oxide) having a reduced viscosity of 10. The resulting mixture was allowed to stand at room temperature (25° C.) and occasionally rotated by hand. After a period of several days, the alkylene oxide polymer had dissolved, yielding a clear viscous liquid. A portion of this solution was cast onto a flat glass surface at room temperature and allowed to dry to constant weight. A flexible, adherent film was thereby formed on the glass. By way of comparison, a film cast in like manner from the same alkylene oxide polymer omitting the use of potassium iodide and employing water as the solvent was stiff and non-adherent.

*Example II*

In a manner similar to that described in Example I, flexible, transparent, adherent films were cast on glass from solutions containing varying amounts of potassium iodide, 100 parts by weight of the poly(ethylene oxide) described in Example I, and 2500 parts by weight of anhydrous methanol. In this series of experiments, 2.5, 12.5, 25, 30, 35, 40, 45, 50, 55, 60, 65, and 70 parts by weight of potassium iodide were employed, independently. A vacuum oven operating at 50° C. was utilized to remove the last traces of methanol in connection with the drying operation. The resulting films in each instance evidenced a substantial improvement in flexibility, clarity, and adhesion as compared with the stiff opaque, non-adherent, film produced in like manner from the same alkylene oxide polymer omitting the use of potassium iodide and employing water as the solvent. Optimum results were obtained in this regard utilizing potassium iodide in a proportion of from about 25 to about 40 percent by weight based upon the weight of the alkylene oxide polymer, a decrease in clarity and little further increase in flexibility being observed at the higher salt concentrations. Similarly improved films are also obtained independently substituting an equal amount of poly(1,2-propylene oxide), poly(1,2-butylene oxide), and poly(mixed ethylene - 1,2 - butylene oxides) of approximately equal reduced viscosity for the poly(ethylene oxide) of this example.

*Example III*

In a manner similar to that described in Examples I and II, transparent films were cast on glass from solutions containing varying amounts of sodium iodide, 100 parts by weight of the poly(ethylene oxide) described in Example I, and 2500 parts by weight of anhydrous methanol. In this series of experiments 2.5, 12.5, 25, 30, 35, 40, 45, 50, 55, 60, 65, and 70 parts by weight of sodium iodide were employed, independently. The resulting films in each instance evidenced a substantial improvement in flexibility, clarity, and adhesion as compared with the stiff, opaque, non-adherent film produced in like manner from the same alkylene oxide polymer omitting the use of potassium iodide and employing water as the solvent. Optimum results were obtained in this regard utilizing sodium iodide in a proportion of from about 25 to about 40 percent by weight based upon the weight of the alkylene oxide polymer, a decrease in clarity and little further increase in flexibility being observed at the higher salt concentrations. Similarly improved films were also obtained independently substituting an equal amount of potassium bromide, ammonium thiocyanate, sodium laurate, sodium oleate, sodium ricinoleate, and sodium salicylate for the sodium iodide of this example.

*Example IV*

In a manner similar to that described in the above examples, a flexible, transparent, adherent film was cast on glass from a solution containing 17.5 parts by weight of potassium iodide, 17.5 parts by weight of sodium iodide, 100 parts by weight of the poly(ethylene oxide) described in Example I, and 2500 parts by weight of anhydrous methanol. The film thus produced evidenced no loss of flexibility or clarity upon aging for several months at 25° C., as compared with the films produced in like manner utilizing 35 parts by weight of only potassium iodide or sodium iodide as the modifying salt, in which a slight loss of flexibility and clarity was observed.

*Example V*

On a laboratory scale, steam-heated, steel, differential two-roll mill, 50 g. of the poly(ethylene oxide) described in Example I was milled for several minutes at 80° C. A solution prepared by dissolving 10 g. of potassium iodide in 30 ml. of an equal weight mixture of water and methanol was slowly added to the alkylene oxide polymer and milled therewith, milling being continued for a total period of 10 min. at 80° C. The milled sheet thereby formed was removed from the mill and dried to constant weight in a vacuum oven at 50° C. The sheet was transparent and flexible, having a stiffness modulus of 4,800 p.s.i. at 20° C. A milled sheet prepared in like manner, employing 15 g. of potassium iodide, was also transparent and flexible, having a stiffness modulus of 1,060 p.s.i. at 20° C. By way of comparison, a milled sheet produced in similar manner, omitting, however, the incorporation of the potassium iodide solution during the milling operation, was opaque and stiff, having a stiffness modulus of 52,000 p.s.i. at 20° C.

*Example VI*

Using the equipment described in Example V, 50 g. of the poly(ethylene oxide) described in Example I was milled with 10 g. of sodium salicylate for 5 min. at 80° C. and for an additional 5 min. at 110° C. The milled sheet thereby formed was removed from the mill and, when cooled to room temperature, was found to be substantially transparent and flexible, having a stiffness modulus of 18,000 p.s.i. at 20° C. In similar manner, milled sheet produced by milling 50 g. of the poly-(ethylene oxide) and 5 g. of ammonium thiocyanate for 10 min. at 100° C., upon removal from the mill and cooling to room temperature, was clear and flexible, having a stiffness modulus of 22,000 p.s.i. at 20° C. When 10 g. of ammonium thiocyanate was employed in like manner, the clear, flexible sheet thereby formed had a stiffness modulus of 185 p.s.i. at 20° C.

What is claimed is:

1. The homogeneous composition comprising a poly-(lower alkylene oxide) having a reduced viscosity of at least 0.5 and from about 10 to about 50 percent by weight, based upon said poly(lower alkylene oxide), of a salt selected from the group consisting of ammonium salts of aliphatic carboxylic acids, ammonium salts of aromatic carboxylic acids, alkali metal salts of aliphatic carboxylic acids, and alkali metal salts of aromatic carboxylic acids, said carboxylic acids containing from 4 to 22 carbon atoms.

2. The homogeneous composition of claim 1 in film form.

3. The homogeneous composition comprising a poly-(ethylene oxide) having a reduced viscosity of at least 1 and from about 20 to about 40 percent by weight, based upon said poly(ethylene oxide), of a salt containing from 4 to 22 carbon atoms selected from the group consisting of ammonium salts of aliphatic carboxylic acids, ammonium salts of aromatic carboxylic acids, alkali metal salts of aliphatic carboxylic acids, and alkali metal salts of aromatic carboxylic acids.

4. The homogeneous composition of claim 3 wherein said salt is sodium oleate.

5. The homogeneous composition of claim 3 wherein said salt is sodium laurate.

6. The homogeneous composition of claim 3 wherein said salt is sodium salicylate.

7. The homogeneous composition comprising a poly-(ethylene oxide) having a reduced viscosity of at least 0.5 and from about 10 to about 50 percent by weight, based upon said poly(ethylene oxide), of a salt containing from 4 to 22 carbon atoms selected from the group consisting of ammonium salts of aliphatic carboxylic acids, ammonium salts of aromatic carboxylic acids, alkali metal salts of aliphatic carboxylic acids, and alkali metal salts of aromatic carboxylic acids.

References Cited by the Examiner
FOREIGN PATENTS

| | | |
|---|---|---|
| 949,992 | 2/1964 | Great Britain. |
| 37–14,488 | 9/1962 | Japan. |
| 1,293,929 | 4/1962 | France. |

OTHER REFERENCES

Text Book of Organic Chemistry, Richter, John Wiley & Sons, N.Y., 1952, page 252. (Copy available in Scient. Lib.)

"Journal of Applied Polymer Science," vol. 1; issue No. 1; pp. 56–62; 1959; Bailey et al. (Copy available in the Scientific Library TP/1/592.)

LEON J. BERCOVITZ, *Primary Examiner.*

C. W. IVY, *Assistant Examiner.*